(12) United States Patent
Doany et al.

(10) Patent No.: US 8,488,921 B2
(45) Date of Patent: Jul. 16, 2013

(54) PACKAGED MULTICORE FIBER OPTICAL TRANSCEIVER MODULE

(75) Inventors: Fuad Elias Doany, Katonah, NY (US); Daniel Michael Kuchta, Patterson, NY (US); Benjamin Giles Lee, New York, NY (US); Petar Pepeljugoski, Tarrytown, NY (US); Clint Lee Schow, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 13/105,104

(22) Filed: May 11, 2011

(65) Prior Publication Data

US 2012/0014639 A1   Jan. 19, 2012

Related U.S. Application Data (60) Provisional application No. 61/364,856, filed on Jul. 16, 2010.

(51) Int. Cl.
*G02B 6/02* (2006.01)
*G02B 6/13* (2006.01)
*G02B 6/36* (2006.01)
*G02B 6/00* (2006.01)

(52) U.S. Cl.
USPC .............................. 385/14; 385/88; 257/200

(58) Field of Classification Search
USPC ....... 156/150; 216/13; 257/200, 728; 385/14, 385/49, 88, 89, 129, 147; 427/163.2
See application file for complete search history.

(56) References Cited

U.S. PATENT DOCUMENTS

| | | | |
|---|---|---|---|
| 3,823,996 A | 7/1974 | Kompfner et al. | |
| 5,195,150 A * | 3/1993 | Stegmueller et al. | 385/33 |
| 6,078,708 A | 6/2000 | de la Tocnay et al. | |
| 6,577,420 B1 | 6/2003 | Ford et al. | |
| 6,659,654 B2 | 12/2003 | Kao | |
| 6,935,792 B2 * | 8/2005 | Saia et al. | 385/92 |

(Continued)

FOREIGN PATENT DOCUMENTS

WO   WO 01/27669   4/2001

OTHER PUBLICATIONS

Rosinski, et al., "Multichannel Transmission of a Multicore Fiber Coupled with Vertical-Cavity Surface-Emitting Lasers" Journal of Lightwave Technology, vol. 17, No. 5, May 1999. pp. 807-810.

(Continued)

*Primary Examiner* — Akm Enayet Ullah
(74) *Attorney, Agent, or Firm* — Anne V. Dougherty; McGinn IP Law Group, PLLC (57) ABSTRACT

A method and structure for coupling to a plurality of multicore optical fiber strands. A first plurality of optoelectronic devices is provided on a surface of a substrate, the first optoelectronic devices being arranged in a 2D array pattern that corresponds to a 2D array pattern corresponding to different light cores of a first multicore optical fiber. A second plurality of optoelectronic devices is provided on the surface of the substrate, the second optoelectronic devices being arranged in a 2D array pattern that corresponds to a 2D array pattern corresponding to different light cores of a second multicore optical fiber. Each optoelectronic device on the substrate surface provides one of a receive function and a transmit function for interacting with a corresponding core of a multicore optical fiber strand.

20 Claims, 11 Drawing Sheets

U.S. PATENT DOCUMENTS

| | | | |
|---|---|---|---|
| 6,948,860 B1 * | 9/2005 | Edwards et al. | 385/88 |
| 7,044,655 B2 | 5/2006 | Kato et al. | |
| 7,058,245 B2 * | 6/2006 | Farahi | 385/14 |
| 7,123,809 B2 | 10/2006 | Yamamoto et al. | |
| 7,136,551 B2 | 11/2006 | Cho et al. | |
| 7,221,829 B2 | 5/2007 | Oono et al. | |
| 7,223,024 B2 * | 5/2007 | Fincato | 385/88 |
| 7,269,321 B2 | 9/2007 | Morris et al. | |
| 7,343,068 B2 | 3/2008 | Shigenaga et al. | |
| 7,548,674 B1 | 6/2009 | Horibe et al. | |
| 7,613,371 B2 | 11/2009 | Ankerhold | |
| 7,654,751 B2 | 2/2010 | Althaus et al. | |
| 7,693,362 B2 | 4/2010 | Fenwick et al. | |
| 2002/0118908 A1 | 8/2002 | Conde et al. | |
| 2003/0231833 A1 * | 12/2003 | Lerner et al. | 385/49 |
| 2004/0109666 A1 * | 6/2004 | Kim, II | 385/147 |
| 2007/0047875 A1 | 3/2007 | Sezerman et al. | |
| 2007/0063342 A1 * | 3/2007 | Chen et al. | 257/728 |
| 2008/0226228 A1 | 9/2008 | Tamura et al. | |
| 2008/0310799 A1 | 12/2008 | Jacobowitz et al. | |
| 2009/0154884 A1 | 6/2009 | Chen et al. | |
| 2009/0180734 A1 | 7/2009 | Fiorentino et al. | |
| 2011/0013865 A1 * | 1/2011 | Shibata et al. | 385/14 |

OTHER PUBLICATIONS

Yao Li, Senior Member, IEEE, Jun Ai and Jan Popelek, "Board-Level 2-D Data-Capable Optical Interconnection Circuits Using Polymer Fiber-Image Guides", Proceedings of the IEEE, vol. 88, No. 6, Jun. 2000, pp. 794-805.

* cited by examiner (RELATED ART)

FIGURE 1

(RELATED ART)

(Related Art)

PACKAGED MULTICORE FIBER OPTICAL TRANSCEIVER MODULE

CROSS-REFERENCE TO RELATED APPLICATIONS

The present Application is related to U.S. Provisional Patent Application No. 61/364,856, filed on Jul. 16, 2010, by Doany, et al., entitled "PACKAGED MULTICORE FIBER OPTICAL TRANSCEIVER MODULE", which provisional application is assigned to the present assignee and incorporated herein by reference.

STATEMENT REGARDING FEDERALLY SPONSORED RESEARCH OR DEVELOPMENT

This invention was made with government support under Contract No. H98230-07-C-0409, awarded by the Department of Defense (DOD). The government has certain rights in the invention.

BACKGROUND OF THE INVENTION

1. Field of the Invention

The present invention generally relates to packaging fiber optical modules. More specifically, a multicore fiber is butt-coupled to a 2D array having a corresponding pattern that matches and aligns with that of the cores in the fiber, using flip-chip mounting involving a hybrid combination of two chip types, including a first chip type having optoelectronic devices to interface with the multicore fiber facet and a second chip type having drivers and/or amplifiers supporting the optoelectronic devices.

2. Description of the Related Art

Multicore fibers, which contain more than one core within a single fiber strand, are gaining significant attention for increasing bandwidth density in telecommunications systems, data communications systems, and computer communications systems. Although most research is focused on single-mode telecomm links, some work is being performed with emphasis on multimode VCSEL-based communications links.

For example, OFS Labs is producing multicore multimode graded-index fibers, and Emcore Corporation has developed arrays of optoelectronic devices for interfacing multicore fiber facets. It is noted that VCSEL (vertical-cavity surface-emitting laser), is a type of semiconductor laser diode with laser beam emission perpendicular from the top surface, contrary to conventional edge-emitting semiconductor lasers which emit from surfaces formed by cleaving the individual chip out of a wafer.

Historically, research articles developing or suggesting the use of multicore fibers in communications systems have recognized the extraordinary difficulty in designing the input/output coupling systems between the end fiber facets and the optoelectronic devices. Some work, for example, by OFS Labs, has been done on building individual core breakout cables, but the fabrication may be quite complex and time consuming.

However, prior to the present invention, no effective mechanism has been developed to provide a practical interface with multicore optical fibers.

Thus, a need continues to exist for an optical and electrical packaging approach for interfacing multicore fibers with optoelectronic arrays, particularly in a manner that is practical and would permit interface for an array of multicore fibers.

SUMMARY OF THE INVENTION

In view of the foregoing, and other, exemplary problems, drawbacks, and disadvantages of the conventional systems, it is an exemplary feature of the present invention to provide a structure (and method) for interfacing multicore fibers with optoelectronic arrays, yielding complete and practical multicore fiber optical links.

In a first exemplary aspect, described herein is an apparatus including: a multicore optical fiber strand comprising a plurality of optical cores and a cladding commonly shared by the plurality of optical cores, the multicore optical fiber not a Photonic Crystal Fiber (PCF), the optical cores being exposed at a surface of an end facet of the multicore optical fiber; and a semiconductor device comprising a substrate; and a plurality of optoelectronic devices formed in the substrate at a surface thereof, in a 2D array pattern matching a 2D array pattern of a plurality of cores at the end facet of the multicore optical fiber strand, each optoelectronic device on the substrate surface providing one of a receive function and a transmit function for interacting with a corresponding core of the multicore optical fiber strand.

In a second exemplary aspect, also described herein is a semiconductor device, including a substrate; a first plurality of optoelectronic devices on a surface of the substrate, arranged in a 2D array pattern that corresponds to a 2D array pattern corresponding to different light cores of a first multicore optical fiber; and a second plurality of optoelectronic devices on the surface of the substrate, arranged in a 2D array pattern that corresponds to a 2D array pattern corresponding to different light cores of a second multicore optical fiber, each optoelectronic device on the substrate surface providing one of a receive function and a transmit function for interacting with a corresponding core of a multicore optical fiber strand.

In a third exemplary aspect, also described herein is a method for coupling to a multicore optical fiber strand, including providing a multicore optical fiber strand comprising a plurality of optical cores and a cladding commonly shared by the plurality of optical cores, the multicore optical fiber not a Photonic Crystal Fiber (PCF), the optical cores being exposed at a surface of an end facet of the multicore optical fiber; providing a substrate, a surface of the substrate including a plurality of optoelectronic devices, arranged in a 2D array pattern that corresponds to a 2D array pattern corresponding to different light cores of the multicore optical fiber, wherein each optoelectronic device on the substrate surface provides one of a receive function and a transmit function for interacting with a corresponding core of the multicore optical fiber strand; and bringing the multicore optical fiber strand into sufficiently close proximity to the plurality of optoelectronic devices to facilitate an optical coupling.

Thus, the present invention provides an optical and electrical packaging approach for interfacing multicore fibers with optoelectronic arrays that is both practical and effective and permits interface for plurality of multicore fibers as an array of fibers.

BRIEF DESCRIPTION OF THE DRAWINGS

The foregoing and other purposes, aspects and advantages will be better understood from the following detailed description of exemplary embodiments of the invention with reference to the drawings, in which.

EXEMPLARY EMBODIMENTS OF THE INVENTION

Referring now to the drawings, and more particularly to FIGS. 1-19, exemplary embodiments and configuration variations of the method and structures according to the present invention will now be described.

The invention disclosed herein describes a full optical and electrical packaging approach for interfacing multicore fibers with optoelectronic arrays, yielding complete multicore fiber optical links in a practical manner. Most generally, the concept includes butt-coupling between arrays of VCSELs or photo detectors (PDs) and arrays of cores contained in a single fiber cladding (i.e., a multicore fiber). In a previous publication by B. Rosinski, et al., a multicore fiber has been butt-coupled to a linear VCSEL array, but never has a VCSEL array been laid out to match the core geometry in a 2D fashion so that each core is matched to a VCSEL (or PD), in combination with using multicore fibers or an array of multicore fibers.

Figure 1:
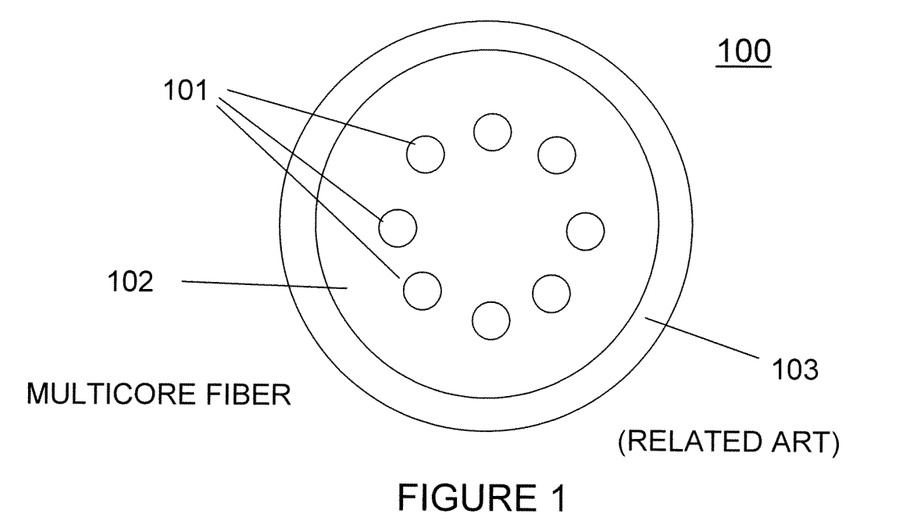
FIG. 1 exemplarily shows a multicore optical fiber 100 to which the present invention is addressed, in which a plurality of cores 101 commonly share a single cladding 102, the cladding sometimes being encased in a protective sheath 103.

FIG. 1 exemplarily shows multicore optical fiber 100 in which more than one optical core 101 shares a common cladding 102. The plurality of optical cores 101 could be arranged in a form of an array within the common cladding 102, such as a symmetrical arrangement around the axis of the common cladding, but other configurations of the plurality of cores is possible and the present invention is not intended as limited by any specific configuration of cores within the common cladding. Each optical core 101 provides a separate optical channel within the common cladding 102, and there may be a protective sheathing layer 103 surrounding the common cladding 102. The present invention involves interface configurations for multicore optical fibers 100.

Figure 2:
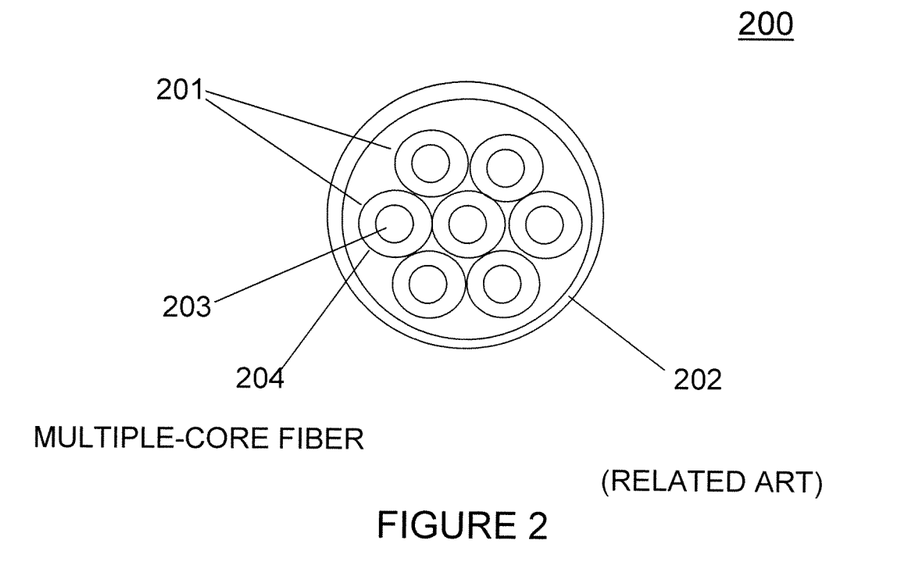
FIG. 2 exemplarily shows a multiple-core optical fiber bundle 200 having multiple fibers 201, encased in a protective sheath 202, each fiber 201 including a core 203 enclosed by its associated cladding layer 204.

In contrast to the multicore fibers 100 of the present invention, FIG. 2 shows a multiple-core fiber 200 in which multiple optical fibers 201 are commonly enclosed in a protective sheath. Each fiber 201 has its own optical core 203 surrounded by its own cladding.

It is noted at this point that a few patents and patent applications using multiple cores (e.g., optical fiber bundles or optical fiber ribbons) refer to the multiple cores 200 shown in FIG. 2 as a "multicore fiber." However, for purpose of the present invention, the term "multicore" refers to the multicore fiber 100 shown in FIG. 1, thereby expressly distinguishing from the multiple-core fiber 200 exemplary shown in FIG. 2. A non-limiting listing of examples of patent documents using the term "multicore" in a manner contrary to the present invention include: U.S. Patent Application Publication No. 2008/0226228 to Tamura, et al., U.S. Pat. No. 6,659,654 to Kao, U.S. Patent Application Publication No. 2002/0118908 to Conde, et al., and U.S. Pat. No. 7, 548, 674 to Horibe, et al.

Figure 14:
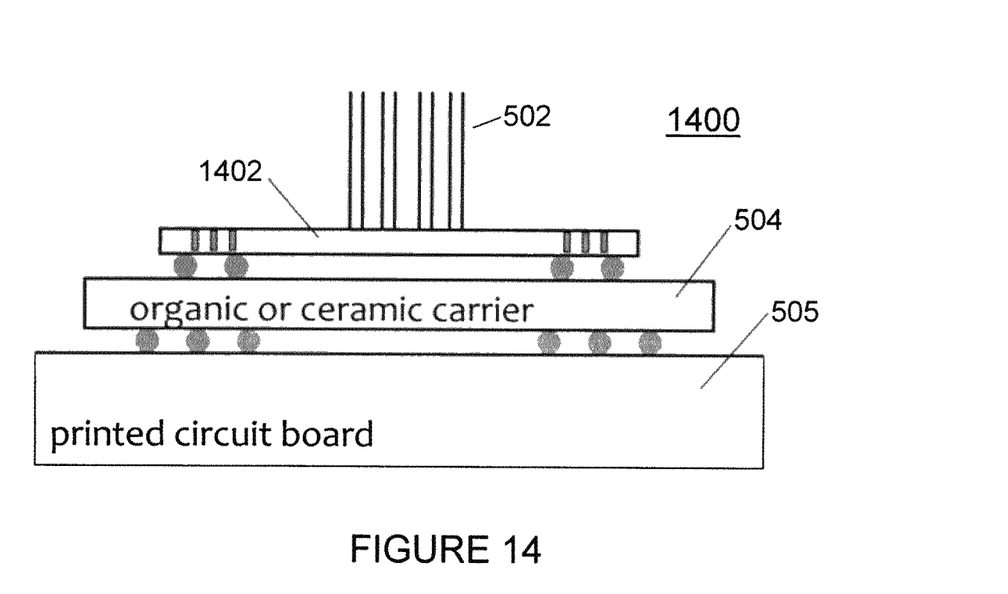
FIG. 14 shows an alternative exemplary configuration 1400 having OE electronic components monolithically integrated into the same chip 1402 as the electrical circuits.

A first exemplary embodiment of the present invention, as shown in various variations in FIGS. 3-7, covers a hybrid integration of two types of chips in a manner that facilitates this butt-coupling to multicore fibers, although a variation of this concept does combine the two chips into a single chip (e.g., see FIG. 14 and its associated description).

Figure 3:
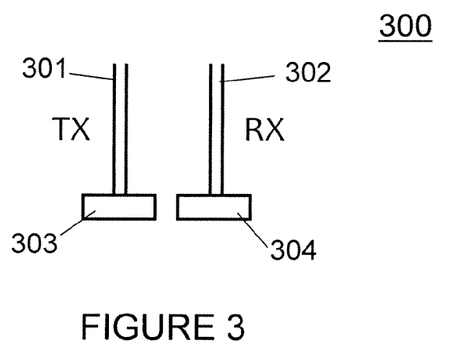
FIG. 3 shows, in side view 300, a first exemplary aspect of the present invention, demonstrating how multicore fiber strands 301, 302 can be butt-coupled to chips 303,304 with OE (optoelectronic) devices, such as a light emitting device (e.g., a VCSEL) or a light detecting device (e.g., a photodetector), that provide interfaces with corresponding optical cores of multicore fibers 301,302.
Figure 4:
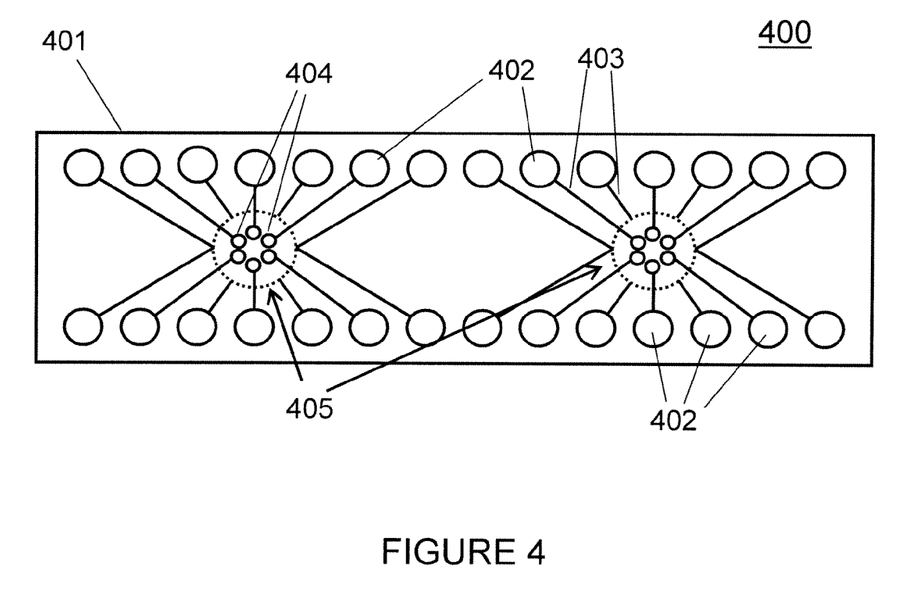
FIG. 4 shows an exemplary layout view 400 of a first exemplary embodiment, demonstrating how an OE chip 401 provides OE devices 404 for a plurality of multicore fibers, exemplarily shown for two multicore fibers 405, such as demonstrated in FIG. 3.
Figure 5:
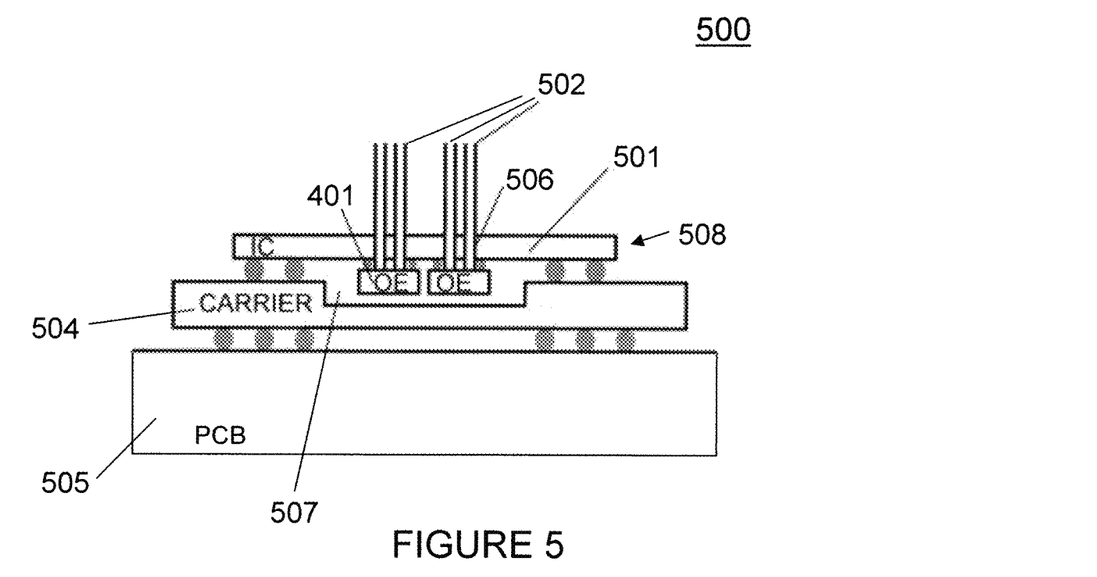
FIG. 5 shows an exemplary side view 500 of one exemplary variation of the first exemplary embodiment, using a hybrid integration of two types of chips with flip-chip bonding, including a first chip type 401 with OE devices and a second type of chip 501 (e.g., "IC chip") with corresponding support electronics, such as drivers or amplifiers, for the OE devices located on the first chip 401.

As exemplarily shown in FIGS. 3, 4, and 5, the first chip type is an optoelectronic (OE) chip 401 having optoelectronic devices, such as VCSELs 303 or PDs 304, arranged in 2D arrays for one-to-one matching to the cores within multicore fibers 301, 302. The second chip type is an electronic integrated circuit chip (IC chip) 501 equipped with driver and amplifier circuits for operating the OEs. The two chip types can be flip-chip bonded to form an optochip 508, which may be further flip-chip bonded (or wire-bonded) to an organic or ceramic carrier 504, which may in turn be bonded to a printed circuit board 505, as will shown exemplarily in several different configurations.

Although the exemplary embodiments described herein consider that VCSELs and PDs would be on separate chips, as is currently common in the art, the present invention is, of course, not limited to configurations in which a single type of OE devices exists on a single chip, and it should be clear that the present invention is not intended as being limited to the optoelectronic devices (VCSEL and PD) exemplarily used to explain the concepts herein.

In some exemplary embodiments described later, the electronic IC 501 has holes (optical vias) 506 fabricated over the OE device array, similar to US patent application publication number 2009/0226130, but differing in that each via in the present invention circumscribes a 2-D array of OE devices (e.g., two or more devices per via). The optical vias 506 allow insertion of the multicore fiber 502 through the IC chip 501, facilitating butt-coupling between the fiber facet and the OE array.

FIG. 4 exemplarily shows the top view 400 an OE device array on an OE chip 401. The chip 401 has bond pads 402 at the top and bottom edges for flip-chip (or wire) bonding to an electrical IC chip. The dotted lines 405 show the outline on the OE chip 401 that would be visible through the optical vias 506.

The bond pads 402 are drawn as two linear arrays, although higher density 2D arrays of bond pads are possible and may be preferable. Surface wiring 403 extends from the bond pads 402 to a 2D array of OE devices (e.g., VCSELs or photodetectors) 404. FIG. 4 exemplarily shows two six-device arrays arranged along a circle. Other geometries are possible, including linear arrays (e.g., 1×N), rectangular arrays (e.g., 2×N, 4×N, etc.), and the hexagonal close-packed lattice arrangement.

More generally, the present invention relates to a transceiver (TRX) including a single multicore fiber interfacing the VCSEL array, providing the transmitter function, and a single multicore fiber interfacing the PD array, providing the receiver function. However, it should be clear that there is configurations are possible, including, for example, a transmitter (TX) only, a receiver (RX) only, and a TX, RX, or TRX having more than one multicore fiber per TX/RX.

As exemplarily shown in FIG. 5, chip 501 can be provided as a second chip type comprising an electronic integrated circuit (IC) equipped with driver and amplifier circuits (not shown) for operating the OEs. FIG. 5 exemplarily shows two OE chips 401 mounted on the IC chip 501, each OE chip 401 butt-coupled to two multicore fibers 502. In this first exemplary embodiment, the two chip types 401, 501 are flip-chip bonded to form an optochip 503, which may be further flip-chip bonded (or wire-bonded) to an organic or ceramic carrier 504, which may in turn be bonded to a printed circuit board 505. In such cases, the organic or ceramic carrier 504 could contain a recessed cavity 507, to permit efficient spacing for the OE chips 401.

Thus, the present invention disclosed herein describes an optical and electrical packaging approach for interfacing multicore fibers with optoelectronic arrays, yielding complete multicore fiber optical links in a practical manner. Most generally, the concept includes butt-coupling between arrays of VCSELs and/or photodetectors (PDs) and arrays of cores contained in a single fiber cladding (i.e. a multicore fiber).

At this point, it is noted that US Patent Application Publication No. 2009/0226130, U.S. patent application Ser. No. 12/045,186, to Doany, et al., filed on Mar. 10, 2008, is somewhat similar in some ways to the flip-chip packaging approach used in some of the exemplary embodiments of the present invention for the interface between the IC and the OE chips using "optical windows" or "optical vias", as exemplarily shown in FIG. 5. However, Doany addresses the matching of 2D arrays of fibers to 2D arrays of "coupling pads", which can include optoelectronic devices such as VCSELs and photodiodes, but does not address multicore fibers, used in the present invention, or even fiber bundles. Doany also uses single-core fibers, whereas the present invention involves multicore fibers, and the array of optoelectronic devices in Doany is replaced by an array of groups of optoelectronic devices.

It is further noted that there have been publications presenting multicore photonic crystal fibers. One example is U.S. Patent Application Publication No. 2009/0180734 to Fiorentino, et al., discussed in more detail at the end of this disclosure. However, photonic crystal fibers carrying multiple cores is a small subset of multicore fibers in general. Additionally, photonic crystal fibers apply generally to single-mode operation since multimode cores with graded indices have not been demonstrated in photonic crystal fibers. Furthermore, they may require more complex preform structures for fabrication, leading to higher cost.

The alignment of the optical via 506 in the electrical IC chip corresponds (after bonding) to an area slightly larger than the OE device array and slightly larger than the fiber cladding dimensions or the fiber jacket dimensions. In this manner, the fiber is inserted into the optical via 506 in the electrical IC chip 501, such that each core of the multicore fiber 502 interfaces with one device within one OE device array. Furthermore, the multicore fiber may be keyed such that one side of the circular cross section has a flat region (with length <<than the fiber diameter). A matching flat can be fabricated in the optical via 506 of the IC chip 501 to facilitate rotational alignment of the cores 502 to the OEs 401.

From the above description, it should be clear that the optical vias 506 may also serve the function of facilitating alignment between the multicore fiber 502 and the group of OE devices 401, and that this alignment may be further extended to rotational alignment through, for example, the flat region on the fiber and the optical via. In general, the fiber connector will be attached to the package so that the fiber facet approaches but does not contact the devices, and the present invention does not require "fixturing" the multicore-fiber connector to the package.

The exemplary embodiment uses multimode graded-index cores made of glass for implementing the multicore fibers. However, fibers made of plastic, single-mode step-index fibers, and multimode step-index fibers can be substituted. In a non-limiting embodiment, the VCSELs ideally operate at a wavelength near 850 nm, but 1-um to 1.5 um VCSELs are also possible to implement. Moreover, the VCSEL and PD arrays can be implemented as common cathode, common anode, or fully-isolated designs.

Figure 6:
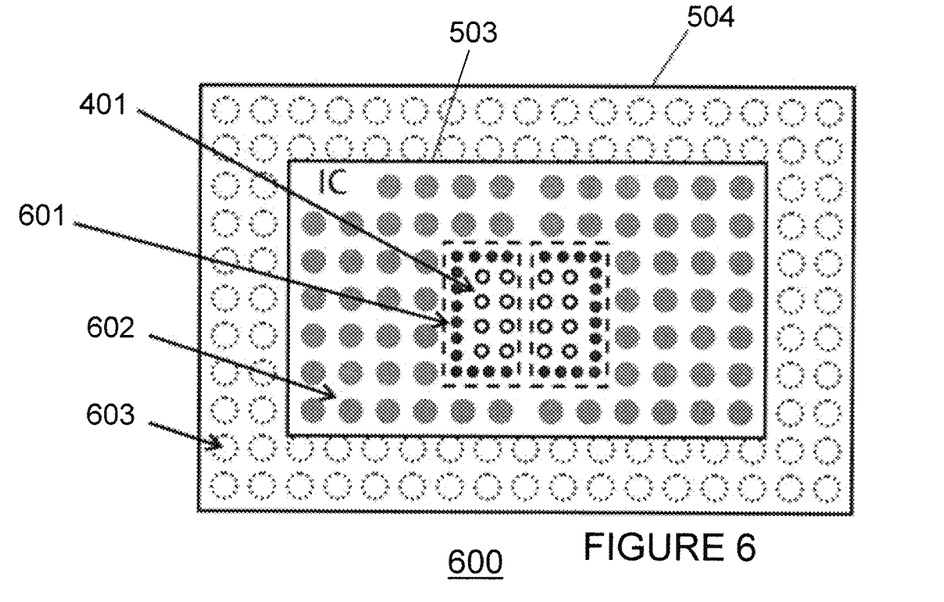
FIG. 6 shows a layout view 600 of the exemplary embodiment 500 shown in cross-sectional view in FIG. 5.

FIG. 6 shows the top view 600 of the buildup 500 shown in FIG. 5, including the organic or ceramic carrier 504 and the IC/OE chip combination 508, previously referred to as an optochip. Also shown are the 2D optical via arrays 506, the OE bond pads 601 for interconnecting the OEs 401 to the carrier 504, the IC bond pads 602 for interconnecting the IC chip 501 to the organic or ceramic carrier 504, and the carrier bond pads 603 for interconnecting the organic or ceramic carrier 504 to a printed circuit board (PCB) 505.

Figure 7:
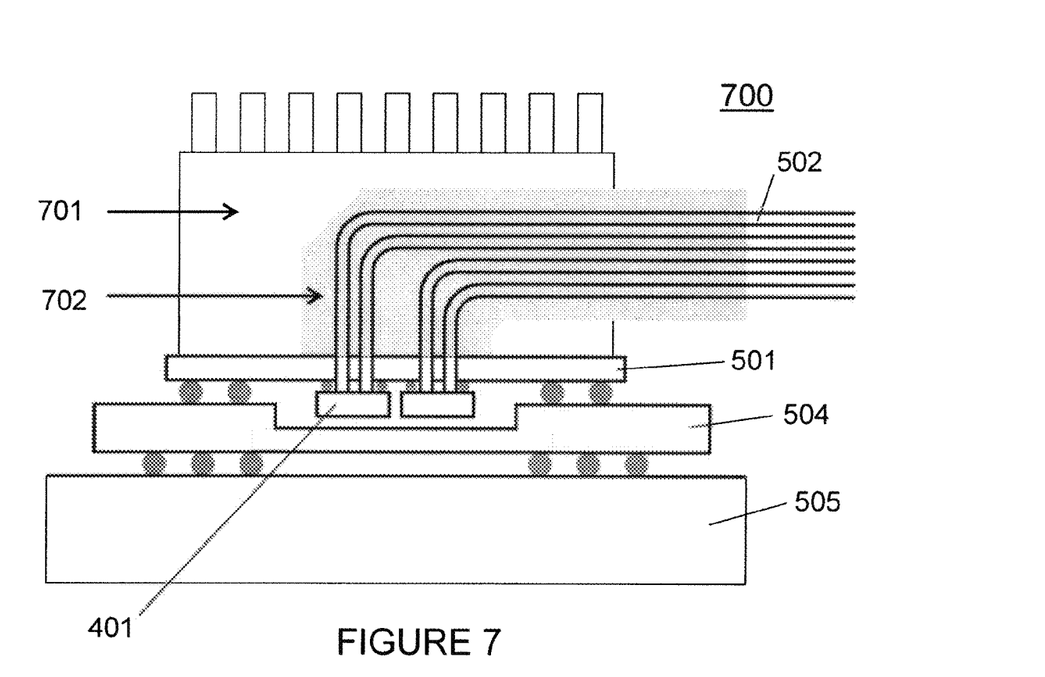
FIG. 7 shows a cross-sectional view 700 of a fully packaged version using an exemplary embodiment of the present invention, as including heat fin 701 providing a 90° elbow for the optical fibers.

In a fully-packaged version 700 exemplarily shown in FIG. 7, a heat spreader 701 is included for increased thermal performance, as well as a low-profile fiber array connector 702 with fiber pitch matched to the optical vias in the electrical IC chip 501. The low-profile fiber array connector 702 provides a 90° elbow for the multicore fibers 502.

Figure 8:
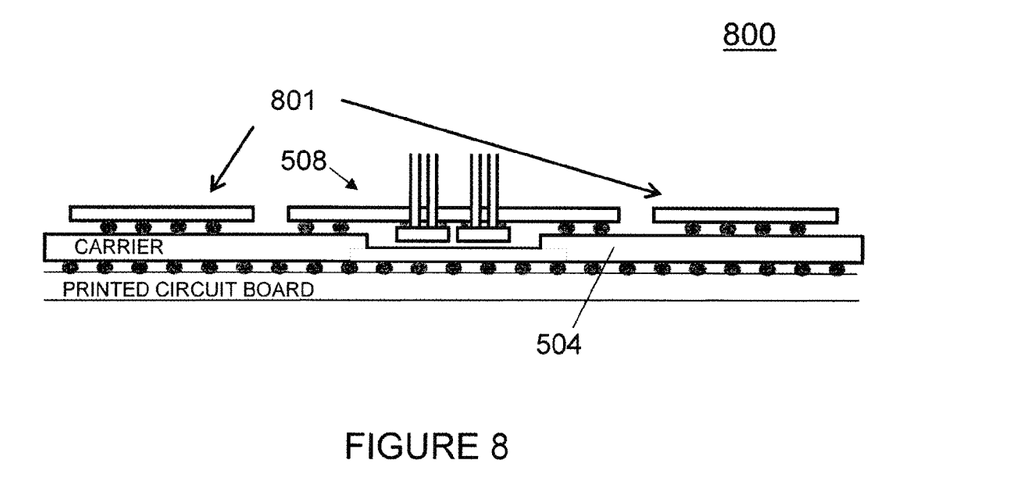
FIG. 8 shows a cross-sectional view 800 of another exemplary variation of an exemplary embodiment of the present invention where other electrical chips 801 are included on, for example, an organic or ceramic carrier.

Additionally, as shown in FIG. 8, another exemplary embodiment may be implemented as a multichip module 800, where one or more electrical chips (e.g. processing chip, router chip, memory chip, other ASIC chip) 801 are bonded to the organic or ceramic carrier 504 in addition to the optochip 508.

Although the exemplary embodiments described a butt-coupling approach between multicore fiber(s) and the OE array(s), alternatives are also possible. For example, a 1× multi-element lens array (not shown) may be implemented at the interface.

Moreover, although VCSELs and PDs were exemplarily used to explain the concepts of the exemplary first embodiment, as components of the OE chips that interface with the cores of the optic fiber, it should be clear that these two optical devices can be generalized as any optical electronic devices capable of interfacing between an electronic circuit and an optic fiber core. Likewise, the receiver amplifiers and transmitter drivers described as integrated into the integrated circuit chip(s) that interface with the OE chips, it should be clear that these integrated circuit components could be generalized as support electronic devices for the optical electronic devices of the OE chips. With these generalizations, it should also be clear that any combination of transmitting and receiving functions related to the optical fiber can be implemented using these generalized components.

A number of exemplary and non-limiting alternate embodiments and configurations are diagrammed in FIGS. 9-17.

Figure 9:
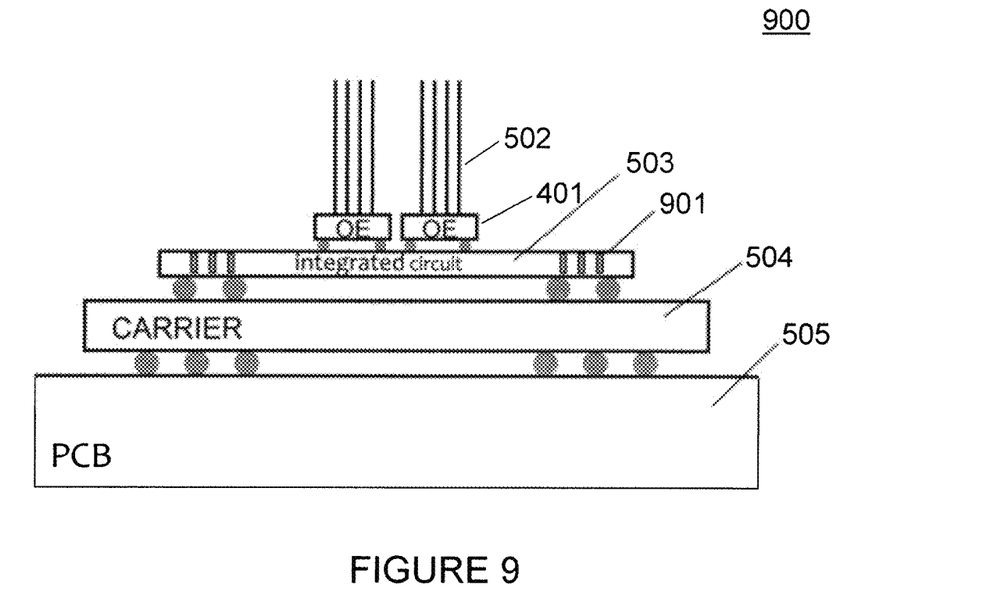
FIG. 9 shows a cross-sectional view 900 of another exemplary configuration, using silicon carrier 504 and with the multicore fiber(s) 502 butt-coupled to the back side of the OE chips 401, so that no optical vias are necessary.

FIG. 9 exemplarily shows a configuration 900 having the multicore fiber strands 502 butt-coupled to the backside of the OE chips 401, with the OE chips 401 being flip-chip bonded to the IC 503. The IC 503 is mounted to organic or ceramic carrier 504, which, in turn is mounted to printed circuit board 505. The OE chips 401 can be, for example, 980-nm wavelength (or longer) back-side emitting/illuminated OEs. It is noted that IC 503 incorporates TSVs, where TSV means "through-silicon via". The TSVs refer to the vertical interconnection vias 901 passing completely through the silicon wafer or die 503. TSVs are commonly used in the art for creating 3D packages and 3D integrated circuits.

Figure 10:
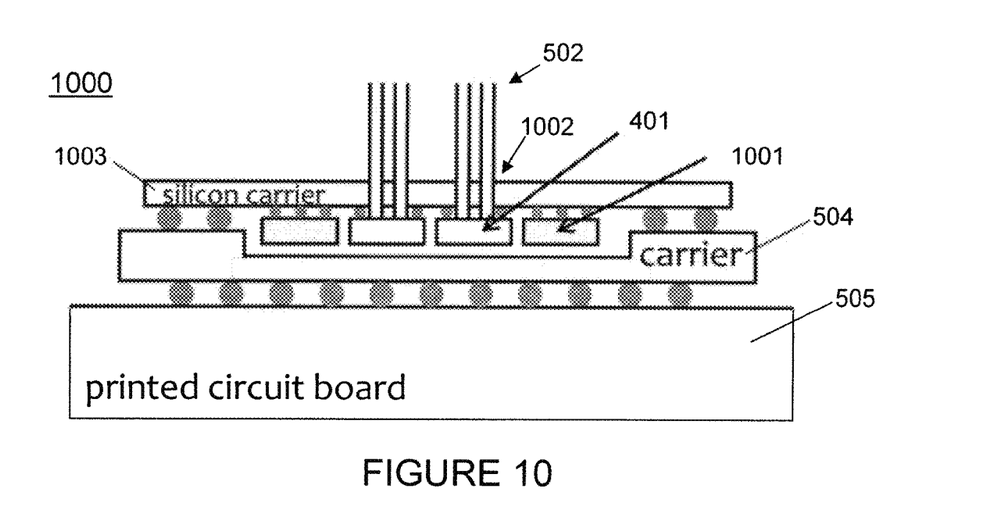
FIG. 10 shows an alternative exemplary configuration 1000 using a silicon carrier 1003 with air-filled optical vias 1002 and with surface wiring between OE and IC bond pads and between IC and sub-carrier 1003 bond pads.

FIG. 10 exemplarily shows a configuration 1000 having the multicore fiber strands 502 inserted through optical vias 1002 in a silicon carrier 1003 upon which is flip-chip bonded the OE chips 401, along with integrated circuit chips 1001 having the laser diode driver circuits and/or receiver amplifier circuits. The OEs 401 are top-side interfacing to the multicore strands 502 and, in a non-limiting example, can be 850-nm OE devices. The silicon carrier 1003 is mounted to an organic or ceramic or glass carrier 504, which is then mounted to printed circuit board 505.

Figure 11:
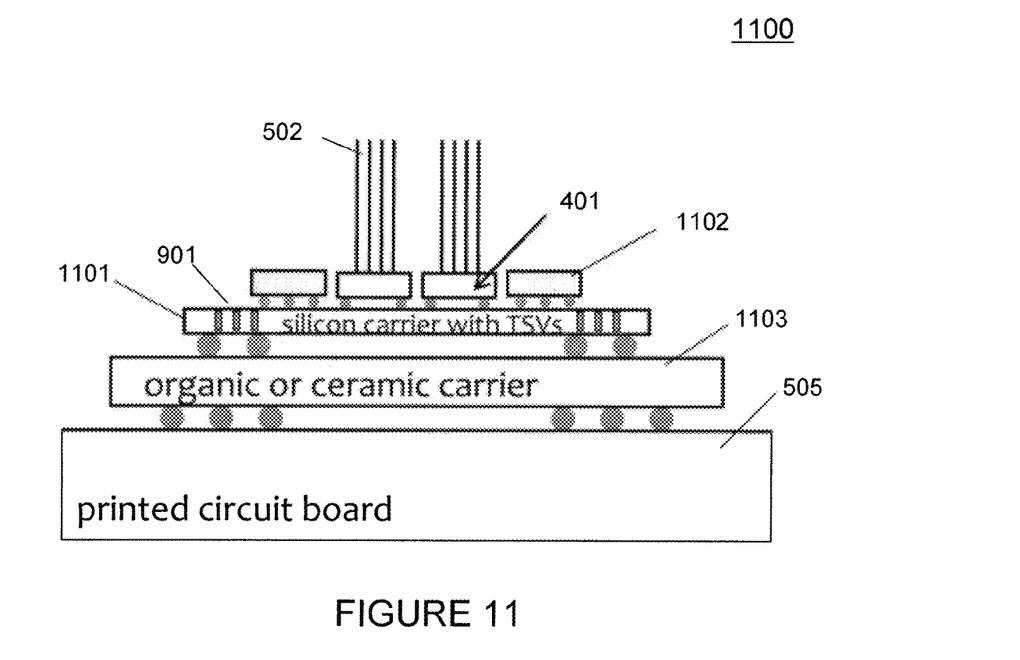
FIG. 11 shows an alternative exemplary configuration 1100 using a silicon carrier 1101 with through-silicon vias 901.

FIG. 11 exemplarily shows a configuration 1100 using a TSV carrier 1101 upon which is mounted the integrated circuit chips 1102 and OE chips 401 to which interface with multicore fiber strands 502 in a back-side configuration so that no optical vias are necessary for the silicon carrier 1101. The TSV carrier 1101 is mounted to an organic or ceramic carrier 1103, which, in turn, is mounted onto printed circuit board 505. Again, the descriptive "TSV" means "through-silicon via" and refers to the vertical interconnection vias 901 passing completely through the silicon wafer or die 1101.

Figure 12:
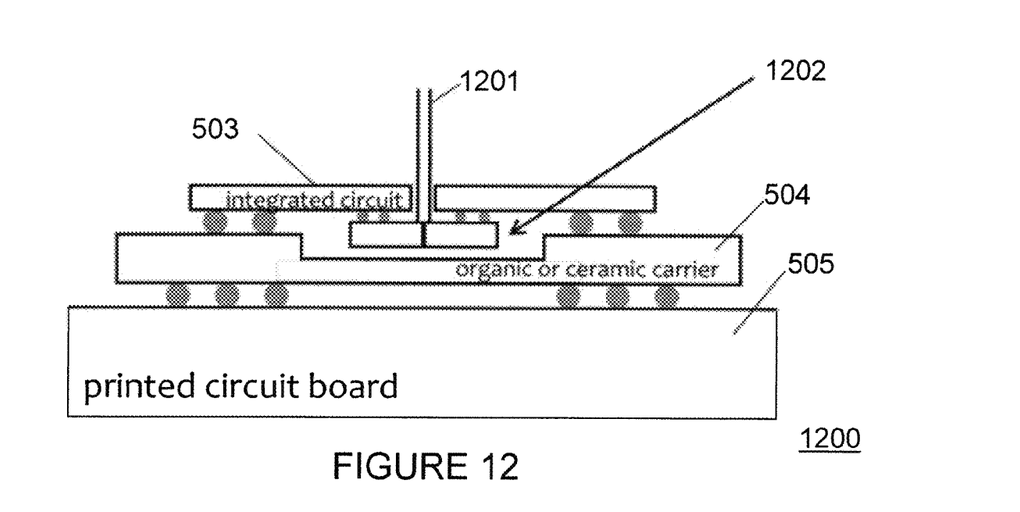
FIG. 12 shows an alternative exemplary configuration 1200 having a bidirectional fiber strand 1201.

FIG. 12 exemplarily shows a configuration 1200 in which multicore fiber strand 1201 is bidirectional in that it contains cores with incoming signals and cores with outgoing signals. In this exemplary configuration the OE chip(s) 1202 can either be a monolithic chip including both VCSELs and PDs or can be two side-joined chips (as exemplarily illustrated), for interfacing half of the cores with VCSELs and half of the cores with PDs. The OEs 1202 are mounted on the integrated circuit 503, which is mounted onto the organic or ceramic carrier 504, which is then mounted on the printed circuit board 505.

Figure 13:
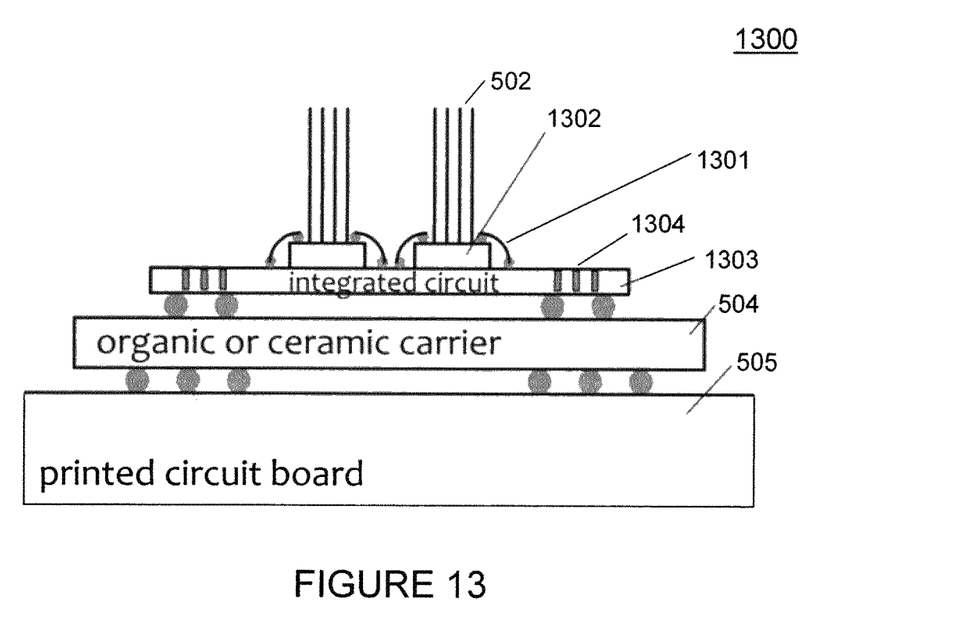
FIG. 13 shows an alternative exemplary configuration 1300 that demonstrates integration between the IC and OE chips using wire-bonds 1301 rather than flip-chip bonds.

FIG. 13 exemplarily shows a configuration 1300 using wire-bonds 1301 for making the electrical interface between the OE chips 1302 and the integrated circuit 1303. The multicore fiber strands 502 are butt-coupled to the top-emitting OE chips 1302, and the integrated circuit 1303 uses TSVs 1304 to interface with the organic or ceramic carrier 504, which is then mounted to the printed circuit board 505.

FIG. 14 exemplarily shows a configuration 1400 in which the multicore fiber strands 502 are butt-coupled to an integrated circuit 1402 that monolithically integrates both the OE devices (e.g., VCSELs and/or PDs) and the electronic support circuits (e.g., drivers and/or amplifiers). The integrated circuit 1402 use TSV to mount to the organic or ceramic carrier 504, which is, in turn, mounted to the printed circuit board 505.

Figure 15:
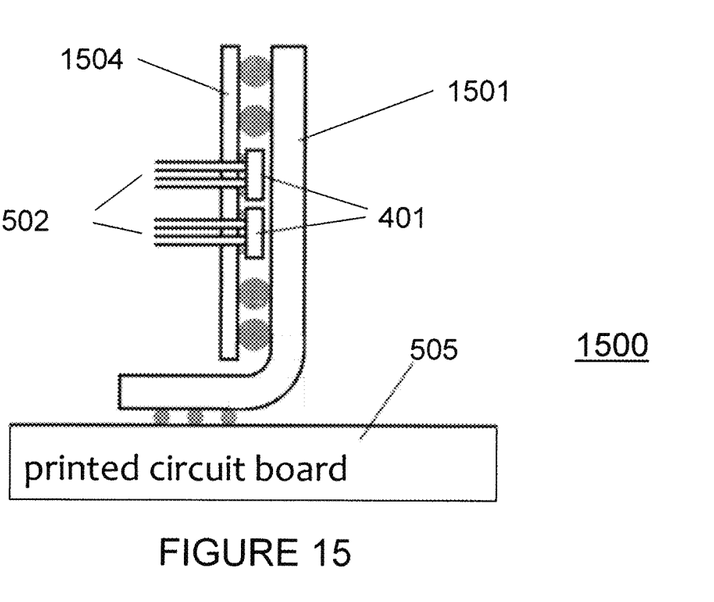
FIG. 15 shows an alternative exemplary configuration 1500 wherein the organic or ceramic carrier is replaced with a flex connector 1501 to provide a right-angle orientation of the optochip.

FIG. 15 exemplarily shows a configuration 1500 using a flexible printed circuit board or flex connector 1501 to interface with printed circuit board 505 (e.g., in place of an organic or ceramic carrier). The OE chips 401 are mounted on integrated circuit 1504 so that the multicore fiber strands 502 can come out parallel to the printed circuit board 505 without needing to implement a 90° bend in the multicore fiber strands.

Figure 16:
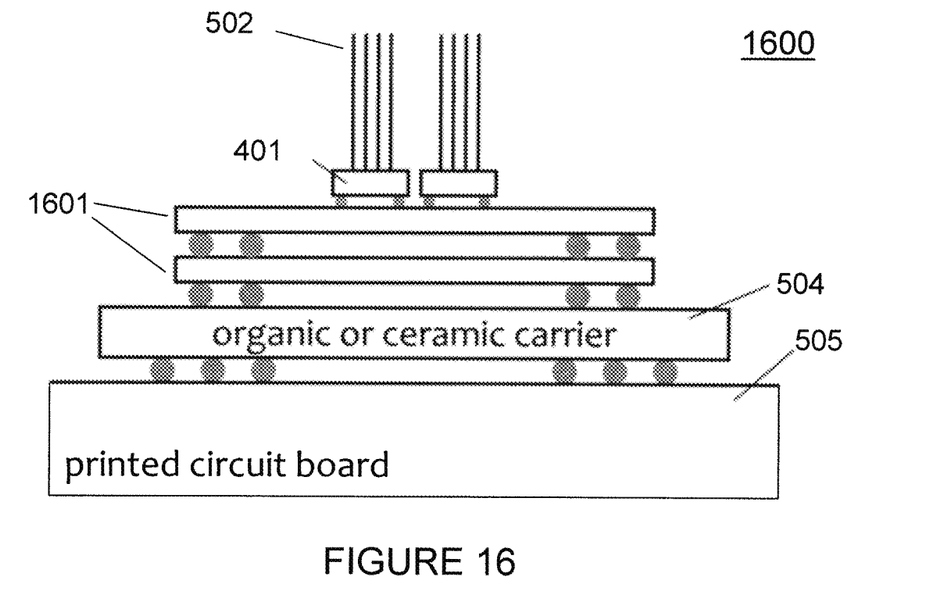
FIG. 16 shows an alternative exemplary configuration 1600 having a 3D chip stack 1601 with OE chips 401 on top of the stack and no optical vias required.

FIG. 16 exemplarily shows a configuration 1600 using a 3D chip stack 1601 allowing the integrated circuit devices to be distributed across the chip stack, thereby increasing circuit density, likely to be the limiting factor for I/O density if OEs are arranged in arrays with such low area. The OE chips 401 use a back-side interface with multicore fiber strands 502 so that no optical vias are necessary in the integrated stack 1601. The 3D stack 1601 is mounted to organic or ceramic carrier 504, which is then mounted to printed circuit board 505.

Figure 17:
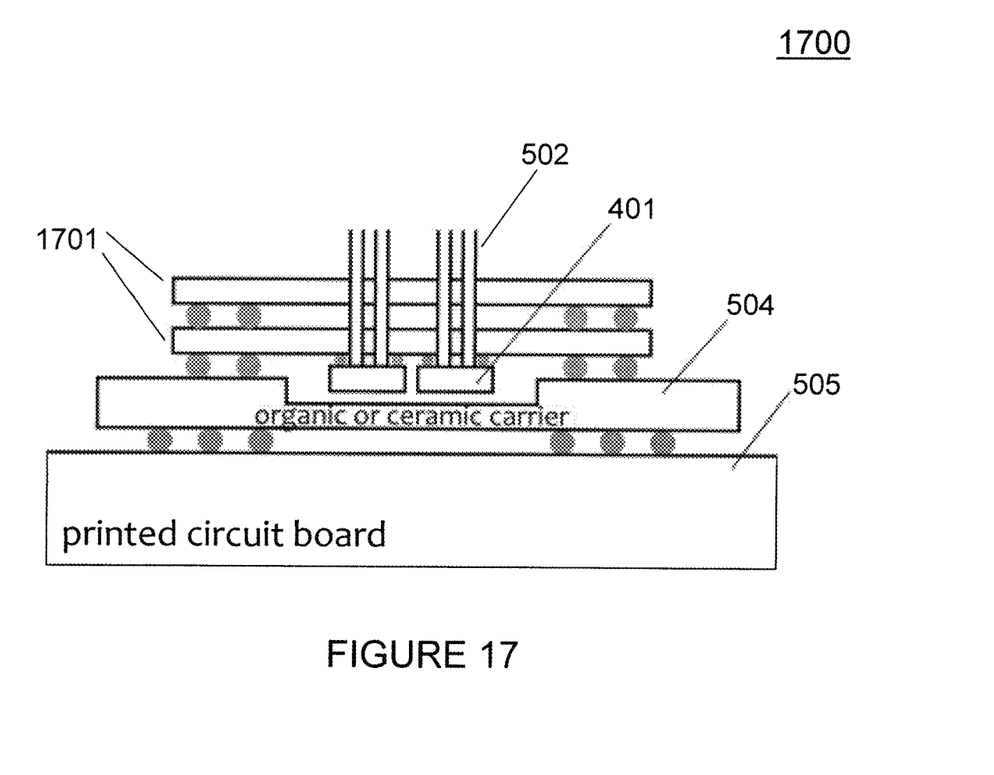
FIG. 17 shows an alternative exemplary configuration 1700 having a 3D chip stack 1701 with aligned optical vias.

FIG. 17 exemplarily shows a configuration 1700 using a 3D chip stack 1701 in which the OE chips 401 are front-side mounted to the multicore fiber strands 502, so that optical vias are aligned throughout the 3D chip stack 1701. The 3D chip stack 1701 is mounted to the organic or ceramic carrier 504, which is then mounted to the printed circuit board 505.

Although a number of exemplary alternate configurations and embodiments are demonstrated, it should be clear that many others are possible using various aspects and features of the exemplary configurations. For example, 3D chip stack or the flex connector or the monolithic integrated circuit configurations can be used as components in any number of combinations not expressly demonstrated.

At this point, now that the present invention has been described, is further discussed how the techniques of the present invention differ from various conventional techniques.

Figure 18:
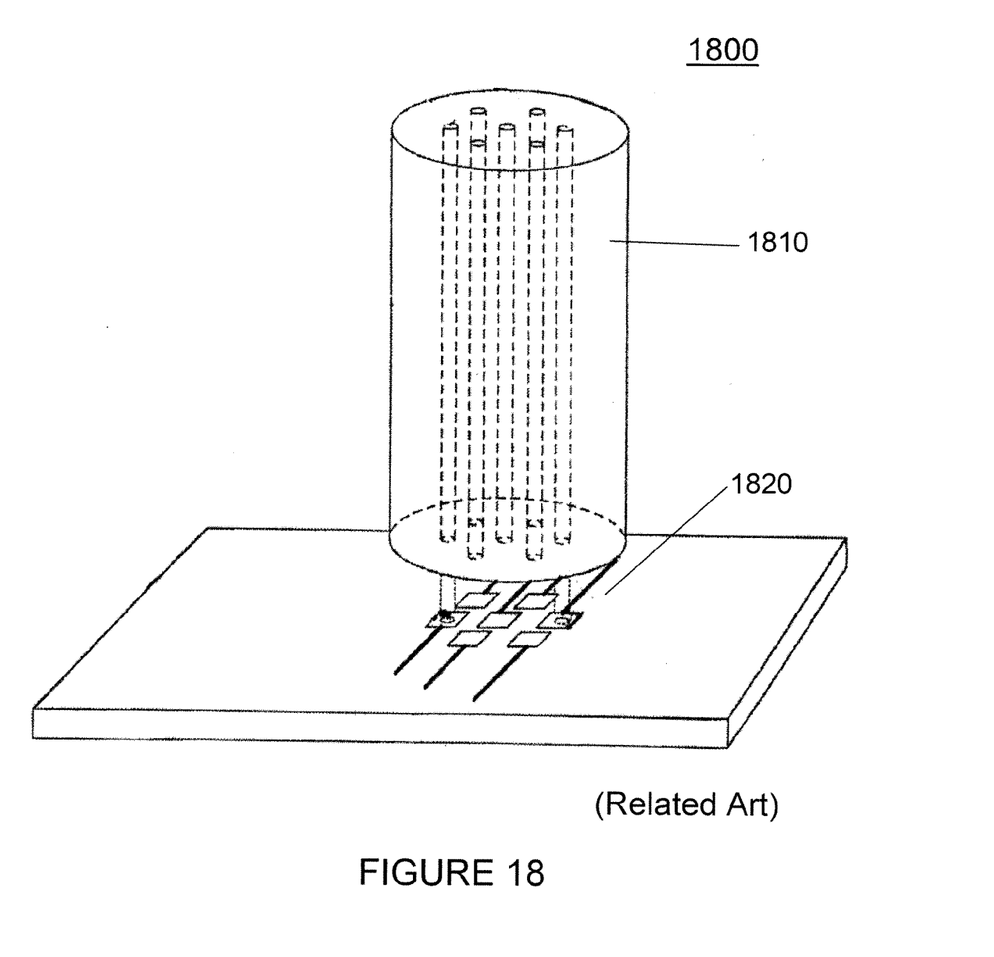
FIG. 18 shows a related art technique 1800 in which a photonic crystal fiber 1810 having a plurality of cores is aligned to a plurality of coupling pads 1820.

In U.S. Patent Application Publication No. 2009/0180734 to Fiorentino, et al., is described a method for aligning a photonic crystal fiber (PCF) having a plurality of cores connected to an optical device. As shown in FIG. 18, an end of the photonic crystal fiber 1810 may be placed on a surface of an optical device having a plurality of coupling pads 1820, and this application describes a method to align the different cores to correspond with the coupling pads.

It is noted that the Fiorentino, et al., patent application is specially tailored to a photonic crystal fiber (PCF). PCF is well known in the industry as a very special non-standard type of fiber. Standard fibers are solid fibers where the guiding mechanism is provided by a region with higher index (the core) than the surroundings (the cladding). Standard fibers have a solid cladding. PCFs utilize a microstructure (commonly of silica and air) to provide the index difference between core and cladding. It is the air pockets (a.k.a. holes or voids) in the cladding that set a PCF apart from a standard fiber.

It is clear that Fiorentino, et al., were thinking of the type of PCF that is well known in the art. This is evident from page 1 paragraph 0015 in which the inventors refer to core materials comprised of solids, gases, liquids, or voids. This type of fiber construction is only possible with the PCF that is comprised of air holes. The type of fiber that can have a void as the core is an even more specialized fiber known as photonic bandgap fiber, a subset of PCF where propagation is allowed in the empty (void) core region because the air holes in the cladding form a photonic bandgap which acts to reflect the light back into the central void. In the case of PCF with solid cores, this again is distinctly different from standard fiber in that the core material is the same as the cladding. The guiding is achieved by the air holes. Standard fibers use a solid core comprised of a different material to obtain an optical index difference needed for guiding.

Furthermore, there is no mention in Fiorentino, et al., of non-uniform cores such as graded index cores. All claims/embodiments refer to Photonic Crystal Fiber (PCF) using coherent optical coupling. The multicore PCF described contains a plurality of cores each for use with coherent single-mode light. The cores are essentially an abrupt change in the index from the core to the clad (e.g. step-index). The coherent operation of the PCF further requires that the cores are separated by at least two core-diameters (to minimize optical cross-talk), as stated in the application. Clearly, Fiorentio, et al., were envisioning single-mode operation from PCF and not multimode operation.

In contrast to Fiorentino, et al., the present invention relates to multicore fiber using standard fiber structures, as opposed to PCF. It is clear that Fiorentino, et al., did not realize this was possible or they would not have limited their invention to PCF. The present invention is envisioned to deal primarily with multimode light transmission. The core size is larger than cores designed for single-mode coherent propagation and support multiple optical modes. In this case, the cores can be placed significantly closer to each other, less than ½-diameter away, since the multimode operation is less susceptible to optical crosstalk. The core/clad construction can be either a step-index or preferably a graded-index construction. The graded index construction uses multiple layers to gradually change the index from the center of the core to the clad.

Figure 19:
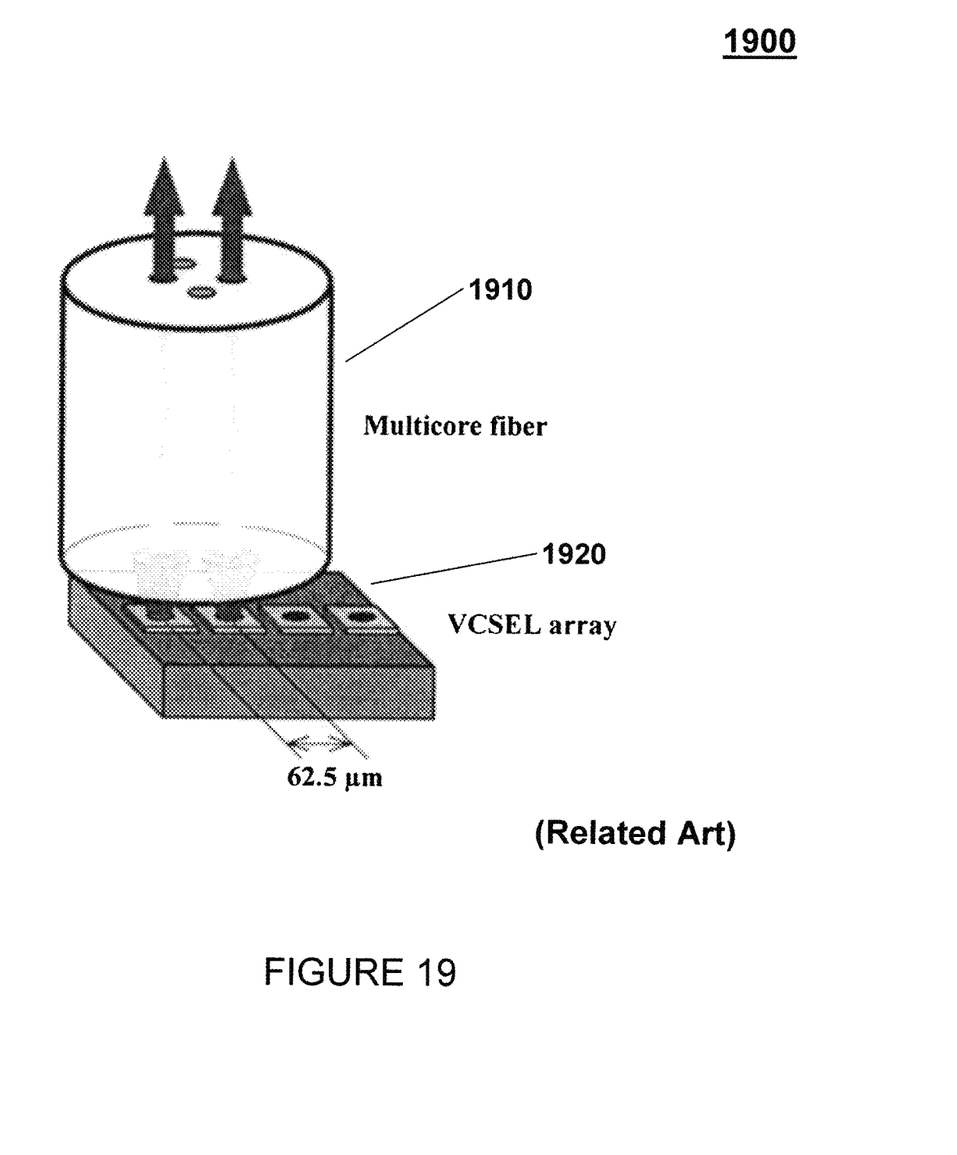
FIG. 19 shows a related art technique 1900 in which is checked interchannel crosstalk in a 2×2 core optical fiber 1910, using VCSEL emitter diodes 1920.

In FIG. 19 is demonstrated a method 1900 described by Rosinski et al., in the article "Multichannel Transmission of a Multicore Fiber Coupled with Vertical-Cavity Surface-Emitting Lasers", Journal of Lightwave Technology, May 1999.

In this publication the authors report coupling a multicore optical fiber 1910 consisting of four cores arranged on a 2×2 grid to a linear array 1920 of VCSELs such that the VCSEL array pitch corresponds to the distance between diagonal cores. The authors then utilize the two cores which are not aligned to the VCSELs for performance monitoring within the channel.

This configuration 1900 is distinctly different from the present invention since the present invention employs 2D arrays of VCSELs (and photodiodes) rather than linear arrays. By doing so, the present invention can fully utilize each of the cores within the multicore fiber for optical transmission with potential to dramatically increase the bandwidth of the transmission medium.

However, although the present invention is distinctly different than Rosinski's paper, the present invention is intended to include configurations in which the plurality of cores in the multicore fiber is arranged in a linear array, and the optoelectronic devices are arranged in a corresponding linear array.

While the invention has been described in terms of various exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. An apparatus, comprising:
    a multicore optical fiber strand comprising a plurality of optical cores and a cladding commonly shared by the plurality of optical cores, the multicore optical fiber not a Photonic Crystal Fiber (PCF), the optical cores being exposed at a surface of an end facet of the multicore optical fiber; and
    a semiconductor device, comprising:
        a substrate; and
        a plurality of optoelectronic devices formed in the substrate at a surface thereof, in a 2D array pattern matching a 2D array pattern of a plurality of cores at the end facet of the multicore optical fiber strand, each optoelectronic device on the substrate surface providing one of a receive function and a transmit function for interacting with a corresponding core of the multicore optical fiber strand.

2. The apparatus of claim 1, wherein the multicore optical fiber strand comprises a first multicore optical fiber strand and the plurality of optoelectronic devices on the substrate comprises a first plurality of optical electronic devices, the apparatus further comprising:
    a second multicore optical fiber strand not a PCF,
    wherein the semiconductor device further comprises, on its surface, a second plurality of optoelectronic devices having a 2D array pattern corresponding to a 2D array pattern of cores in the second multicore optical fiber strand,
    the semiconductor device thereby providing a 2D array pattern for interfaces of a plurality of multicore optical fibers.

3. A semiconductor device, comprising:
    a substrate;
    a first plurality of optoelectronic devices on a surface of the substrate, arranged in a 2D array pattern that corresponds to a 2D array pattern corresponding to different light cores of a first multicore optical fiber; and
    a second plurality of optoelectronic devices on the surface of the substrate, arranged in a 2D array pattern that corresponds to a 2D array pattern corresponding to different light cores of a second multicore optical fiber,
    each optoelectronic device on the substrate surface providing one of a receive function and a transmit function for interacting with a corresponding core of a multicore optical fiber strand.

4. The semiconductor device of claim 3, further comprising:
- a first plurality of bonding pads, each respectively connected electrically to one of the optoelectronic devices of the first plurality of optoelectronic devices; and
- a second plurality of bonding pads, each respectively connected electrically to one of the optoelectronic devices of the second plurality of optoelectronic devices.

5. The semiconductor device of claim 3, wherein each of the optoelectronic devices comprises at least one of a photodetector and a light emitting diode.

6. The semiconductor device of claim 5, wherein the light emitting diode comprises a vertical-cavity surface-emitting laser (VCSEL) and the multicore fiber is butt-coupled to the optoelectronic devices.

7. The semiconductor device of claim 3, further comprising:
- a first plurality of operating devices, each respectively supporting an operation of the first plurality of optoelectronic devices; and
- a second plurality of operating devices, each respectively supporting an operation of the second plurality of optoelectronic devices.

8. The semiconductor device of claim 7, further comprising:
- a first plurality of bonding pads, each respectively connected electrically to a first terminal of one of the operating devices of the first plurality of operating devices;
- a second plurality of bonding pads, each respectively connected electrically to a first terminal of one of the operating devices of the second plurality of operating devices; and
- a third plurality of bonding pads, each respectively connected electrically to a second terminal of one of the operating devices of the first or second plurality of operating devices.

9. An optochip, comprising:
the semiconductor device of claim 4; and
an integrated circuit chip (IC chip), comprising:
- an IC chip substrate;
- a first plurality of operating devices, each respectively supporting an operation of the first plurality of optoelectronic devices, fabricated on the IC chip;
- a second plurality of operating devices, each respectively supporting an operation of the second plurality of optoelectronic devices, fabricated on the IC chip
- a first plurality of IC chip bonding pads, each respectively connected electrically to a first terminal of one of the operating devices of the first plurality of operating devices;
- a second plurality of IC chip bonding pads, each respectively connected electrically to a first terminal of one of the operating devices of the second plurality of operating devices; and
- a third plurality of IC chip bonding pads, each respectively connected electrically to a second terminal of one of the operating devices in the first or second plurality of operating devices.

10. The optochip of claim 9, wherein the semiconductor device and the IC chip are interconnected such that the first and second plurality of bonding pads are each respectively bonded to a corresponding bonding pad of the first and second plurality of IC chip bonding pads using a flip-chip bonding.

11. The optochip of claim 9, wherein the semiconductor device and the IC chip are affixed to each other and the first and second plurality of bonding pads are each respectively bonded to a corresponding bonding pad of the first and second plurality of IC chip bonding pads using bonding wires.

12. The optochip of claim 9, wherein the IC chip comprises at least one optical via through which can pass a multicore optical fiber, to facilitate interface with the multicore optical fiber.

13. The optochip of claim 12, wherein the multicore optical fiber has at least one flat region on an outer surface thereof and the at least one optical via is shaped to match the at least one flat region, thereby providing a keying mechanism to orient the multicore optical fiber to the optochip.

14. An optical fiber assembly, comprising:
the semiconductor device of claim 8; and
a carrier upon which the semiconductor device is mounted, the carrier including:
- a first plurality of carrier bonding pads electrically connected to the third plurality of bonding pads on the semiconductor device, using one of flip-chip bonding or wire-bonding; and
- a second plurality of the carrier bonding pads to electrically connect the carrier to a printed circuit board.

15. An optical fiber assembly, comprising:
the optochip of claim 9; and
at least one level of higher-level components in the optical fiber assembly, the optochip being mounted on a first-level component of the at least one level of higher-level components, the first level component including:
- a first plurality of first-level component bonding pads electrically connected to the third plurality of IC chip bonding pads, using one of flip-chip bonding or wire-bonding; and
- a second plurality of the first-level component bonding pads to electrically connect the first level component a next higher level component in the optical fiber assembly.

16. The optical fiber assembly of claim 15, wherein the first-level component comprises one of:
- a carrier that has a further plurality of bonding pads to mount the optochip to a printed circuit board;
- a silicon carrier upon which is additionally mounted one or more additional integrated circuit chips, the silicon carrier including a further plurality of bonding pads for the silicon carrier to be mounted to a next-level component;
- a first level in a 3D chip stack assembly, the 3D chip stack assembly including a further plurality of bonding pads for the 3D chip stack assembly to be mounted to a next-level component; and
- a flex connector permitting the multicore optical fibers to be mounted parallel to a printed circuit board, the flex connector including a further plurality of bonding pads for the flex connector to be mounted to the printed circuit board.

17. The optical fiber assembly according to claim 15, further comprising a heat spreader in contact with the optochip.

18. An apparatus, comprising:
the optical fiber assembly of claim 14; and
at least two multicore optical fibers.

19. An apparatus, comprising:
the optical fiber assembly of claim 15; and
at least two multicore optical fibers.

20. A method for coupling to a multicore optical fiber strand, the method comprising:
providing a multicore optical fiber strand comprising a plurality of optical cores and a cladding commonly shared by the plurality of optical cores, the multicore optical fiber not a Photonic Crystal Fiber (PCF), the optical cores being exposed at a surface of an end facet of the multicore optical fiber;

providing a substrate, a surface of the substrate including a plurality of optoelectronic devices, arranged in a 2D array pattern that corresponds to a 2D array pattern corresponding to different light cores of the multicore optical fiber, wherein each optoelectronic device on the substrate surface provides one of a receive function and a transmit function for interacting with a corresponding core of the multicore optical fiber strand; and bringing the multicore optical fiber strand into sufficiently close proximity to the plurality of optoelectronic devices to facilitate an optical coupling.

* * * * *